(12) United States Patent
Araki

(10) Patent No.: US 12,141,488 B2
(45) Date of Patent: Nov. 12, 2024

(54) IMAGE FORMING APPARATUS AND METHOD FOR CONTROLLING AN IMAGE FORMING APPARATUS CAPABLE OF COMMUNICATING WITH A SYSTEM FOR CENSORSHIP FUNCTION

(71) Applicant: CANON KABUSHIKI KAISHA, Tokyo (JP)

(72) Inventor: Keishi Araki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/932,231

(22) Filed: Sep. 14, 2022

(65) Prior Publication Data

US 2023/0092023 A1 Mar. 23, 2023

(30) Foreign Application Priority Data

Sep. 21, 2021 (JP) .................................. 2021-152862

(51) Int. Cl.
*G06F 3/12* (2006.01)
*G06F 21/60* (2013.01)

(52) U.S. Cl.
CPC .......... *G06F 3/1238* (2013.01); *G06F 3/1222* (2013.01); *G06F 21/608* (2013.01)

(58) Field of Classification Search
None
See application file for complete search history.

(56) References Cited

U.S. PATENT DOCUMENTS

| | | | | |
|---|---|---|---|---|
| 7,274,477 B2 * | 9/2007 | Reese | ....................... | H04L 9/40 358/1.15 |
| 2009/0296166 A1 * | 12/2009 | Schrichte | ............ | G06F 21/6245 358/474 |
| 2012/0028659 A1 * | 2/2012 | Whitney | ............. | H04M 1/7243 455/466 |
| 2014/0055808 A1 * | 2/2014 | Nakajima | ............. | G06F 21/608 358/1.14 |
| 2019/0014121 A1 * | 1/2019 | Nakamura | ............... | H04L 63/04 |

FOREIGN PATENT DOCUMENTS

| | | | |
|---|---|---|---|
| CN | 101753765 A | * | 6/2010 |
| JP | 2001325080 A | * | 11/2001 |
| JP | 2010049520 A | | 3/2010 |

OTHER PUBLICATIONS

English translation of JP-2001325080-A. (Year: 2001).*
English translation of CN-101753765-A. (Year: 2010).*

* cited by examiner

*Primary Examiner* — Thomas D Lee
(74) *Attorney, Agent, or Firm* — Canon U.S.A., Inc. IP Division

(57) ABSTRACT

An image forming apparatus cannot perform control according to the setup environment of the image forming apparatus and/or the user privilege of a login user when printability/non-printability is determined on a cloud service having a censorship function. An aspect of the present disclosure is an image forming apparatus capable of communicating with a system having a censorship function. After transmitting data information targeted for censorship to the system, the image forming apparatus receives a result of the censorship and is caused to function according to a predetermined operation corresponding to the received result of the censorship.

22 Claims, 11 Drawing Sheets

| ALERT TYPE | OPERATION ON CLOUD | OPERATION ON MULTIFUNCTION PERIPHERAL |
|---|---|---|
| LIKELIHOOD_UNSPECIFIED | DATA COPIABLE | PRINTABLE |
| VERY_UNLIKELY | DATA COPIABLE | PRINTABLE |
| UNLIKELY | DATA COPIABLE | PRINTABLE |
| POSSIBLE | DATA COPIABLE | PRINTABLE |
| LIKELY | DATA NON-COPIABLE ONLY READ PERMITTED | NON-PRINTABLE |
| VERY_LIKELY | EVEN READ PROHIBITED | NON-PRINTABLE |

| ALERT TYPE | OPERATION ON CLOUD DLP | OPERATION ON MULTIFUNCTION PERIPHERAL (OFFICE) | OPERATION ON MULTIFUNCTION PERIPHERAL (SATELLITE) | OPERATION ON MULTIFUNCTION PERIPHERAL (HOME) |
|---|---|---|---|---|
| LIKELIHOOD_UNSPECIFIED | DATA COPIABLE | PRINTABLE | PRINTABLE | PRINTABLE |
| VERY_UNLIKELY | DATA COPIABLE | PRINTABLE | PRINTABLE | PRINTABLE |
| UNLIKELY | DATA COPIABLE | PRINTABLE | PRINTABLE | NON-PRINTABLE |
| POSSIBLE | DATA COPIABLE | PRINTABLE | NON-PRINTABLE | NON-PRINTABLE |
| LIKELY | DATA NON-COPIABLE ONLY READ PERMITTED | NON-PRINTABLE | NON-PRINTABLE | NON-PRINTABLE |
| VERY_LIKELY | EVEN READ PROHIBITED | NON-PRINTABLE | NON-PRINTABLE | NON-PRINTABLE |

CENSORSHIP SETTINGS

[ ZERO-TRUST MODE SETTING ]
701 — ☐ ENABLE ZERO-TRUST MODE

[ OPERATION SETTING ]
PLEASE SET THE PRINT OPERATION AT THE TIME OF THE ALERT

702 —

| ALERT TYPE | OPERATION ON CLOUD | OPERATION ON MULTIFUNCTION PERIPHERAL |
|---|---|---|
| LIKELIHOOD_UNSPECIFIED | DATA COPIABLE | PRINTABLE |
| VERY_UNLIKELY | DATA COPIABLE | PRINTABLE |
| UNLIKELY | DATA COPIABLE | PRINTABLE |
| POSSIBLE | DATA COPIABLE | PRINTABLE |
| LIKELY | DATA NON-COPIABLE ONLY READ PERMITTED | NON-PRINTABLE |
| VERY_LIKELY | EVEN READ PROHIBITED | NON-PRINTABLE |

CHANGE — 710

[ SETTING OF OPERATION WHEN PRINTING IS PROHIBITED ]
703 — ▣ DISPLAY PROHIBITION ON OPERATION UNIT   ☐ NOTIFY BY E-MAIL

730 — CANCEL        OK — 720

FIG. 10

EXAMPLE OF OPERATION TABLE ACCORDING TO USER PRIVILEGE
OF LOGIN USER OF MULTIFUNCTION PERIPHERAL

1010

| ALERT TYPE | OPERATION ON CLOUD DLP | OPERATION ON MFP (MANAGERIAL STAFF) | OPERATION ON MFP (NON-GENERAL STAFF) |
|---|---|---|---|
| LIKELIHOOD_UNSPECIFIED | DATA COPIABLE | PRINTABLE | PRINTABLE |
| VERY_UNLIKELY | DATA COPIABLE | PRINTABLE | PRINTABLE |
| UNLIKELY | DATA COPIABLE | PRINTABLE | NON-PRINTABLE |
| POSSIBLE | DATA COPIABLE | PRINTABLE | NON-PRINTABLE |
| LIKELY | DATA NON-COPIABLE ONLY READ PERMITTED | NON-PRINTABLE | NON-PRINTABLE |
| VERY_LIKELY | EVEN READ PROHIBITED | NON-PRINTABLE | NON-PRINTABLE |

IMAGE FORMING APPARATUS AND METHOD FOR CONTROLLING AN IMAGE FORMING APPARATUS CAPABLE OF COMMUNICATING WITH A SYSTEM FOR CENSORSHIP FUNCTION

BACKGROUND

Field of the Disclosure

The present disclosure relates to an image forming apparatus, a method for controlling an image forming apparatus, a printing system, and a method for controlling an printing system.

Description of the Related Art

A recent change in work styles has been accelerating the trend that workers and devices disperse. These circumstances have been leading to an increase in such usages that access is attempted not only from inside firewalls but also directly from external networks such as the Internet. Due to such a background, security models have been shifting from the perimeter defense model focusing on securing the perimeter using a firewall against outside to the concept of zero-trust security defense based on the belief that people are fundamentally evil assuming that nothing should be trusted.

Because a document printed by a printing apparatus may be lost or should be prevented from leading to an information leak by a malicious user, even the content of the data should be confirmed to prevent an information leak. Mechanisms for data censorship (data loss prevention (DLP)) are provided in general cloud services as the method for checking even the content of the data, and can be used to determine whether confidential information is contained in the data.

Japanese Patent Application Laid-Open No. 2010-49520 discusses a method that inspects print data on a server to determine printability/non-printability, and transmits a printability/non-printability result to a printing apparatus.

SUMMARY

An image forming apparatus according to an aspect of the present disclosure is an image forming apparatus capable of communicating with a system having a censorship function. The image forming apparatus includes a transmission unit configured to transmit data information targeted for censorship to the system, a reception unit configured to receive a result of the censorship from the system, and a control unit configured to cause the image forming apparatus to function according to a predetermined operation corresponding to the received result of the censorship.

Further features of the present disclosure will become apparent from the following description of exemplary embodiments with reference to the attached drawings.

BRIEF DESCRIPTION I/F THE DRAWINGS

FIG. 5A illustrates an example of an operation table when alert information is acquired on a printing apparatus according to one or more aspects of the present disclosure and FIG. 5B illustrates an example of an operation table different for each location.

FIG. 7 illustrates an example of a screen to set the operation when the alert information is acquired.

FIG. 10 illustrates an example of an operation table when the alert information is acquired on the printing apparatus according to one or more aspects of the present disclosure.

DESCRIPTION I/F THE EMBODIMENTS

Each exemplary embodiment of the present disclosure will be described in detail with reference to the accompanying drawings. However, each exemplary embodiment that will be described below does not limit the disclosure defined according to the claims, and, further, not all of combinations of features that will be described in each exemplary embodiment are necessarily essential to the solution of the present disclosure.

A printing apparatus, a multifunction peripheral, or an MFP (Multi Functional Peripheral) will be described as an example of an image forming apparatus according to the present exemplary embodiments. Further, a server, a personal computer (PC), or the like will be described as an example of an information processing apparatus. Further, data and data information targeted for censorship will be described as an example of print data to be printed by the image forming apparatus according to the present exemplary embodiments.

Figure 1:
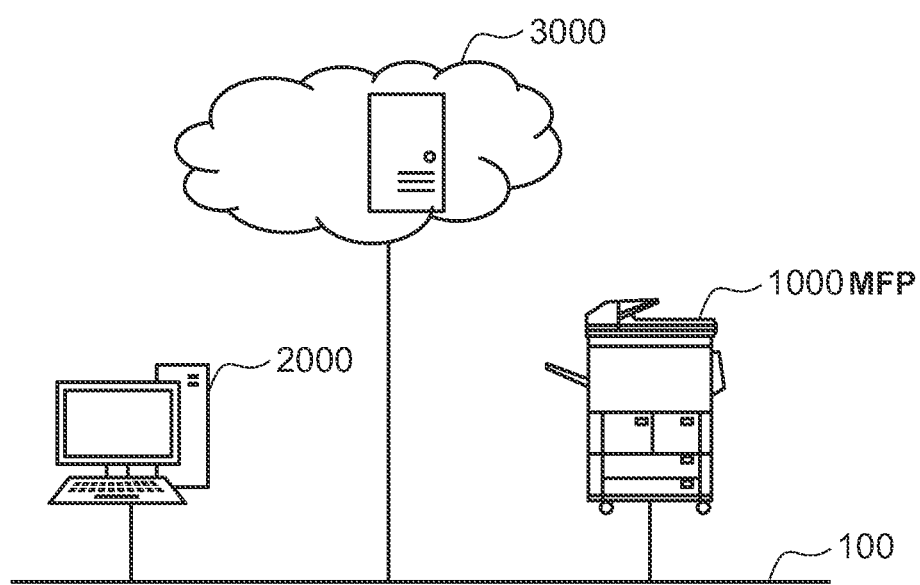
FIG. 1 illustrates an example of a system configuration diagram according to one or more aspects of the present disclosure.

FIG. 1 is a network configuration diagram according to a first exemplary embodiment. A system indicating the network configuration illustrated in FIG. 1 will be referred to as a "printing system" in the present exemplary embodiment. A multifunction peripheral 1000 having a print function can communicate with the information processing apparatus such as a PC 2000 via a network 100. The print data, scanned image data, management information of a device, and the like can be transmitted and received in the communication. Further, the multifunction peripheral 1000 having the print function can transmit and receive data, a result of the censorship (alert information), and the like to and from a cloud service 3000 including one or a plurality of information processing apparatuses (servers).

A mechanism for data censorship (data loss prevention (DLP)) is provided in the cloud service 3000 as one of services. The data censorship (DLP) can determine whether a prohibited word registered in advance is not contained in the content of the print data, and, for example, conceal or delete determined confidential information portion. This will be specifically described citing an example when, for example, a telephone number is set as the prohibited word.

First, the cloud service 3000 is set in such a manner that some kind of control is performed on data in which a telephone number is written. The control can have various contents, and examples applicable as this control include returning a response as an alert signal at one of a plurality of stages indicating how much the telephone number is revealed in the data, notifying an administrator registered in advance, and blackening the telephone number portion. Next, at a timing when data is stored on the cloud service 3000 or a censorship instruction is issued, the content of the stored data is checked. For the telephone number, the data is checked by, for example, searching for a predetermined number of enumerated numbers. Subsequently, if the data is determined to contain a telephone number by the check, this data is subjected to the control based on the preset content.

The type of the prohibited word that can be determined on the DLP, the content of the settable control, and the method for checking the content of the data differ depending on the content of the service provided on the cloud service, and are not limited. FIG. 1 illustrates only one apparatus as each of the multifunction peripheral, the PC, and the server, but the printing system is not limited thereto. For example, the printing system may include a plurality of multifunction peripherals, a plurality of PCs, and a plurality of servers.

Figure 2:
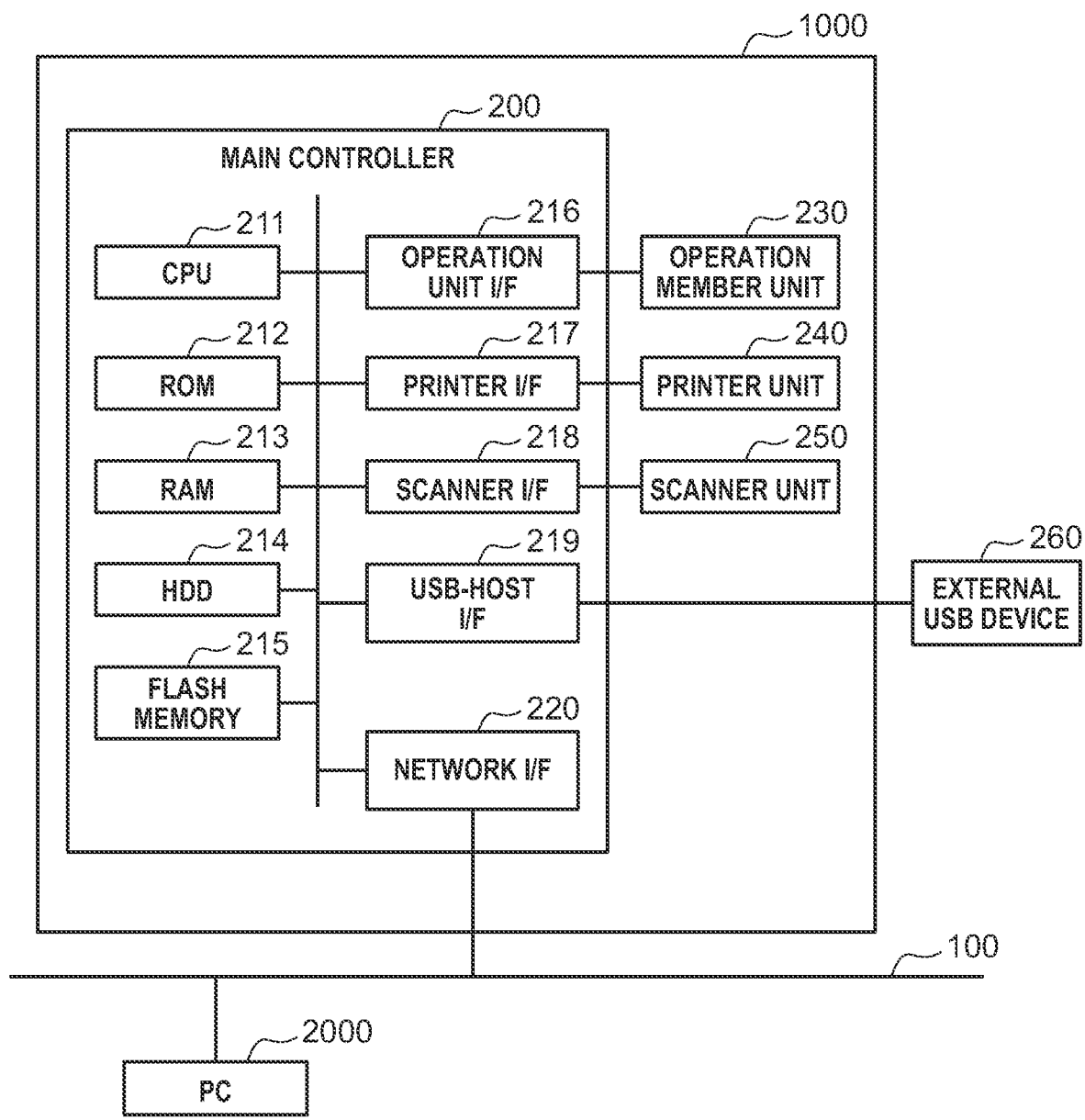
FIG. 2 illustrates an example of a hardware configuration diagram of a multifunction peripheral according to one or more aspects of the present disclosure.

FIG. 2 is a hardware block diagram illustrating the configuration of the multifunction peripheral 1000. The multifunction peripheral 1000 includes a main controller 200 and each unit. The main controller 200 includes a central processing unit (CPU) 211, a read-only memory (ROM) 212, a random access memory (RAM) 213, a hard disk drive (HDD) 214, and a flash memory 215. Further, the main controller 200 includes an operation unit interface (UF) 216, a printer I/F 217, a scanner I/F 218, a Universal Serial Bus (USB)-Host I/F 219, and a network I/F 220.

The CPU 211 executes a software program of the multifunction peripheral 1000 and controls the entire apparatus. The ROM 212 is a read-only memory, and stores a boot program of the multifunction peripheral 1000, a fixed parameter, and the like therein. The RAM 213 is a random access memory, and is used to, for example, store a program and temporary data when the CPU 211 controls the multifunction peripheral 1000.

The HDD 214 is a hard disk drive, and stores system software, an application, and various kinds of data therein. The CPU 211 executes the boot program stored in the ROM 212, loads the program stored in the HDD 214 into the RAM 213, and executes this loaded program, thereby controlling the operation of this multifunction peripheral 1000. The flash memory 215 stores a loader, a kernel, and an application therein. Further, the flash memory 215 stores therein license information for activating the function of the multifunction peripheral 1000, and a signature and a public key used for verification used to detect alteration of a program, besides an execution program.

The operation unit I/F 216 is an I/F for transmitting an instruction input by a user of the multifunction peripheral 1000 via an operation member unit 230 to the CPU 211. Further, the operation unit I/F 216 receives a processing content to switch a content displayed on the operation member unit 230 from the CPU 211 and transmits it to the operation member unit 230. The operation member unit 230 includes a liquid crystal display unit having a touch panel function, a keyboard, and the like, and displays the state of the multifunction peripheral 1000 and an operation menu and receives the instruction of the user.

The printer I/F 217 controls, for example, print processing by a printer unit 240. The scanner I/F 218 controls reading of an original document by a scanner unit 250.

The USB-Host I/F 219 is an interface for connecting the main controller 200 and an external USB device 260. Now, examples of the external USB device 260 include a facsimile (FAX) unit. In the case of the example of the FAX unit, FAX transmission is carried out based on image data transferred from the HDD 214 via the USB-Host I/F 219.

Further, image data is generated based on received data, and the image data is transferred to the HDD 214 via the USB-Host I/F 219. The image data stored in the HDD 214 is printed onto a recording sheet or the like by the printer unit 240 as described above. The examples of the external USB device 260 also include a USB memory and a USB keyboard. An update file required for an update of firmware can also be transferred from the USB memory. The network I/F 220 controls transmission and reception of data to and from an external information processing apparatus via the network 100.

Figure 3:
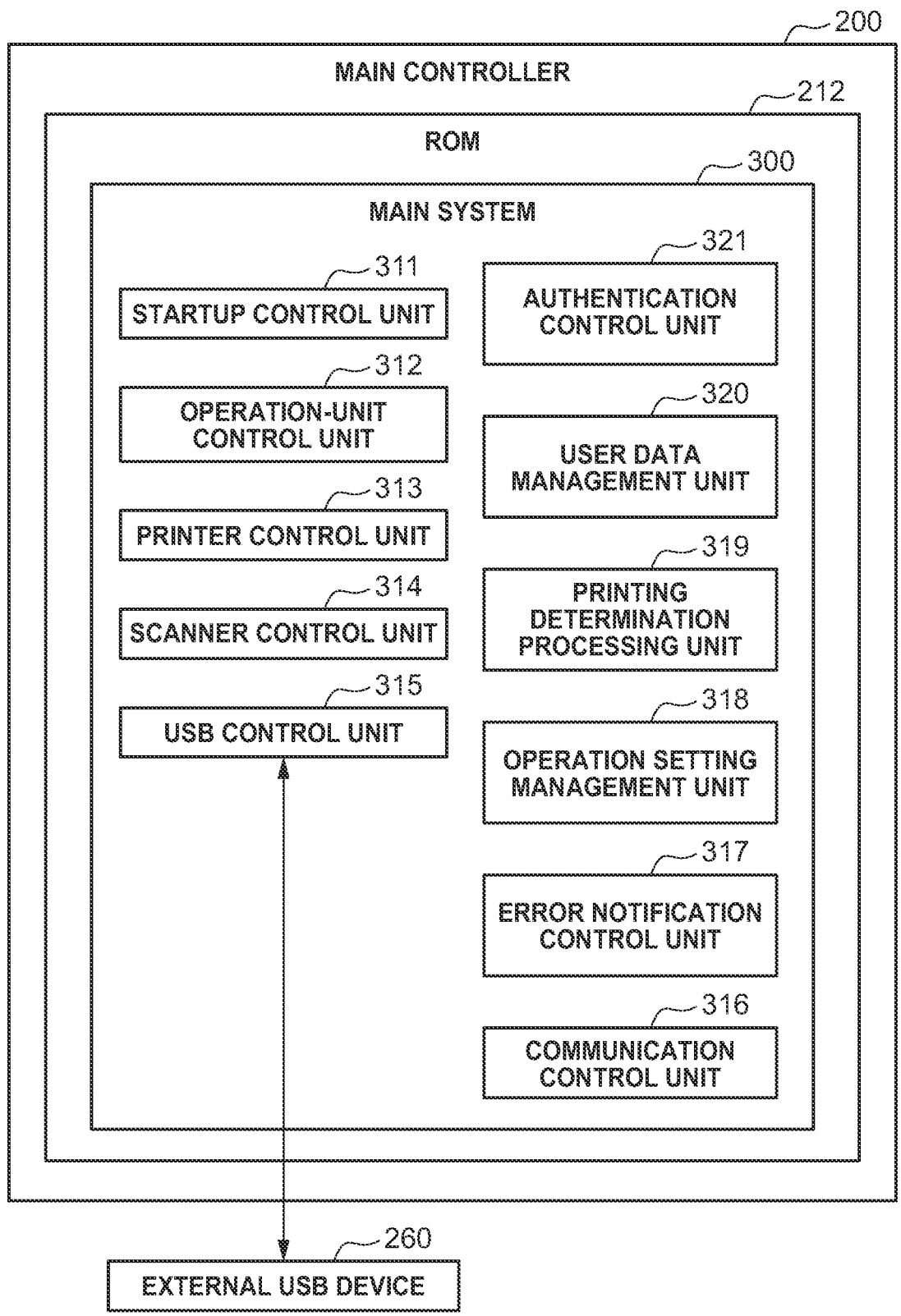
FIG. 3 illustrates an example of a software configuration diagram of the multifunction peripheral according to one or more aspects of the present disclosure.

FIG. 3 is a block diagram illustrating software modules indicating the configuration of the multifunction peripheral 1000 according to the first exemplary embodiment. The software modules illustrated in this FIG. 3 are realized by the CPU 211 executing the program loaded in the RAM 213.

A startup control unit 311 is a program for controlling processing at the time of a startup of the multifunction peripheral 1000, and starts up an operation system (OS) of the main controller 200 and launches a basic system for causing various kinds of programs to run.

An operation-unit control unit 312 is a program for controlling the operation member unit 230 via the operation unit I/F 216. A printer control unit 313 controls the printing by the printer unit 240, and a scanner control unit 314 is a module for fulfilling a function such as reading an original document by the scanner unit 250. A USB control unit 315 is a program for controlling, via the USB-Host I/F 219, a USB device disposed beyond it. A communication control unit 316 is a module for controlling a plurality of communication protocols supported by the multifunction peripheral 1000 via the network I/F 220.

An error notification control unit 317 controls an error content that the operation member unit 230 or an external apparatus connected via the network 100 is notified of, when a problem is detected in the content of the print data by print data censorship processing, which will be described below with reference to FIG. 6.

An operation setting management unit 318 is a program for managing an operation setting when the alert information is acquired, which will be described below with reference to FIGS. 5A and 5B and 7. The operation setting of the multifunction peripheral 1000 when the alert information is acquired is provided by the administrator managing the multifunction peripheral 1000 to the printer control unit 313 at the time of the printing.

A printing determination processing unit 319 determines printability/non-printability on the multifunction peripheral 1000 according to the alert information resulting from the censorship processing by the information processing apparatus 3000. For the determination about the printability/non-printability, the printing determination processing unit 319 refers to the operation setting management unit 318, which manages the operation setting when the alert information is acquired, and determines the printability/non-printability on the multifunction peripheral 1000. A user data management unit 320 is a program for managing data of a user who can use the multifunction peripheral 1000. An authentication control unit 321 controls authentication of a user requesting the authentication to the multifunction peripheral 1000 based on the user information registered with the user data management unit 320.

Figure 4A:
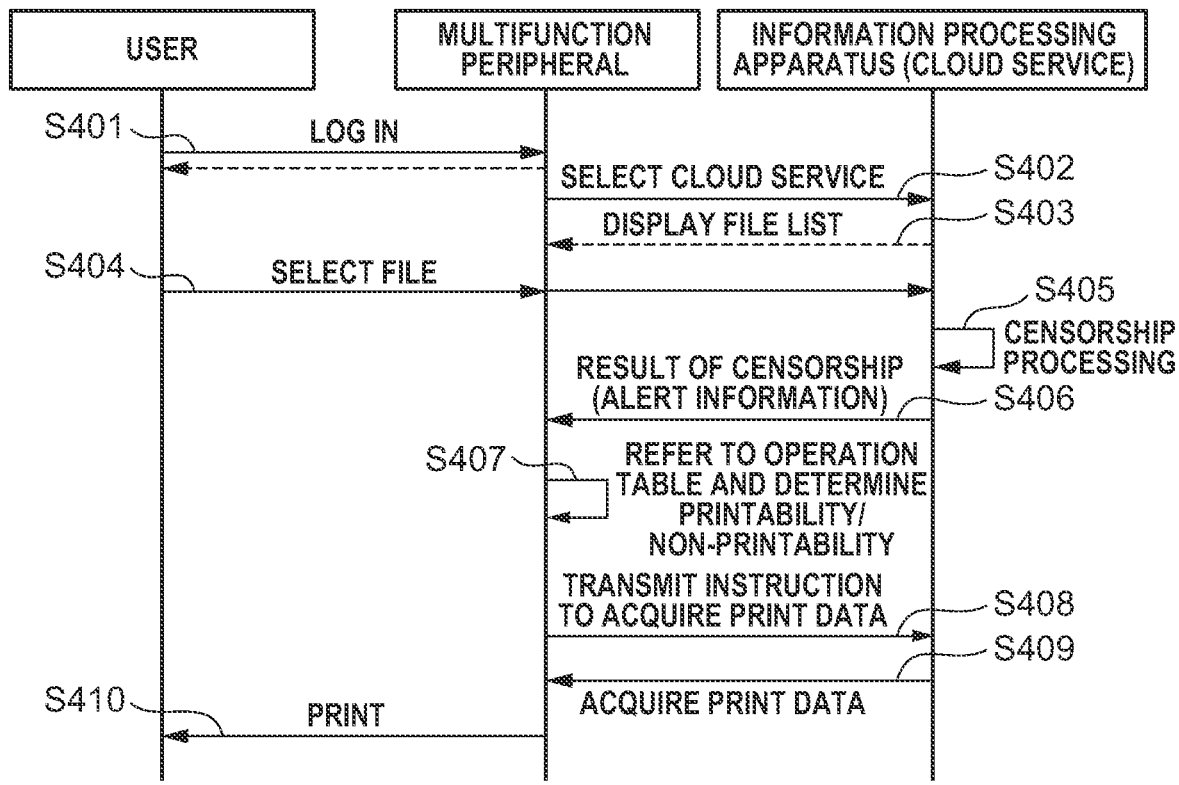
FIG. 4A illustrates an example of a sequence diagram according to one or more aspects of the present disclosure.

FIG. 4A illustrates a sequence diagram when no confidential information is contained in data selected by the user according to the present exemplary embodiment.

In step S401, the user attempts a login to the multifunction peripheral 1000. The login processing is performed based on information such as a user identification (ID) and a password received from the user at the time of the login. If the login is permitted, for example, a login ticket including login user information is issued. The login ticket is information generated according to a success in the authentication of the user. The login ticket is, for example, encrypted credential information, which is a bit sequence arranged according to a predetermined rule. Subsequently, in step S402, the user selects the cloud service 3000 storing therein data that the user wants to print. This causes a login to the cloud service 3000 using the login ticket.

Next, in step S403, the multifunction peripheral 1000 receives file list information on the cloud service 3000 to which the user has logged in from the information processing apparatus, and displays a file list on the operation member unit 230 on the multifunction peripheral 1000.

In step S404, the user selects the data that the user wants to print from the file list displayed on the operation member unit 230.

Then, in step S405, the cloud service 3000 performs censorship processing on the data selected by the user in step S404. After the censorship processing by the cloud service 3000 is ended, in step S406, the result of the censorship (the alert information) is transmitted to the multifunction peripheral 1000.

Next, in step S407, the multifunction peripheral 1000 refers to an operation table of the multifunction peripheral 1000 according to the alert information type, which will be described below with reference to FIGS. 5A and 5B, and determines whether the data selected by the user can be printed.

In step S408, the multifunction peripheral 1000 transmits an instruction to acquire the print data to the cloud service 3000 if determining that the data can be printed as a result of the printability/non-printability determination processing in step S407.

In step S409, the multifunction peripheral 1000 acquires the print data from the cloud service.

In step S410, the multifunction peripheral 1000 prints the print data acquired in step S409.

Figure 4B:
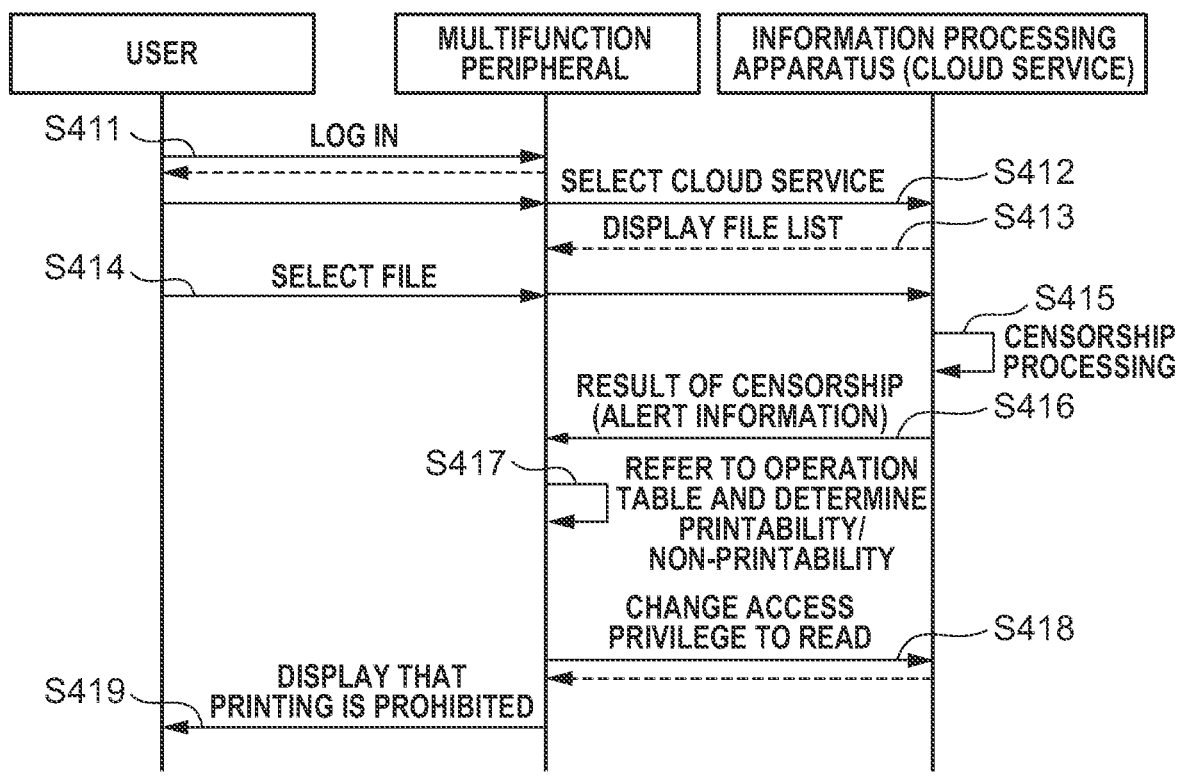
FIG. 4B illustrates an example of a sequence diagram according to one or more aspects of the present disclosure.

FIG. 4B illustrates a sequence diagram when confidential information is contained in the data selected by the user according to the present exemplary embodiment. Processing similar to steps S401 to S405 in FIG. 4A is performed in steps S411 to S415.

In step S416, it is determined for the multifunction peripheral 1000 that confidential information is contained or may be contained as a result of the censorship processing by the cloud service 3000 in step S415, and the multifunction peripheral 1000 receives the result of the censorship (the alert information) corresponding thereto.

Then, in step S417, the multifunction peripheral 1000 refers to the operation table of the multifunction peripheral 1000 according to the alert information type illustrated in FIGS. 5A and 5B, which will be described below, and determines whether the data can be printed. If determining that the data cannot be printed in step S417, the multifunction peripheral 1000 performs processing based on the settings of the operation on the cloud service 3000 and the operation on the multifunction peripheral 1000 illustrated in FIGS. 5A and 5B.

For example, if the result of the censorship received in step S416 is LIKELY (FIGS. 5A and 5B), which is an alert when confidential information is likely contained, in step S418, the multifunction peripheral 1000 changes the access privilege for the above-described data to Read to the cloud service 3000. In the present exemplary embodiment, Read means read-only data. Then, the multifunction peripheral 1000 displays that the data cannot be printed on the operation member unit 230 or the like toward the user.

The present sequence has been described citing the processing that changes the access privilege to Read in FIG. 4B, but the multifunction peripheral 1000 may be controlled so as to print the data while masking the confidential information portion.

Further, the present sequence has been described regarding the censorship system in the case where the print data is stored in the storage on the cloud service 3000 having the censorship function in FIGS. 4A and 4B, but the print data does not have to be stored in the storage on the cloud service 3000. In this case, in steps S404 and S414, the print data or information indicating the location of the print data such as a Uniform Resource Locator (URL) is transmitted from the multifunction peripheral 1000 to the information processing apparatus 3000.

FIG. 5A illustrates an example of an operation table 500 of the information processing apparatus (cloud) 3000 and the multifunction peripheral 1000 when the alert information is acquired, which is managed by the operation setting management unit 318, in the system according to the present exemplary embodiment. Regarding the content of the operation table 500, an operation table having the same content may be prepared in common for a plurality of multifunction peripherals connected to the cloud 3000 or an operation table having a different content may be prepared for each multifunction peripheral. The former case means that the same determination result is output regardless of the setup environment of the multifunction peripheral. The latter case allows the printability/non-printability to be determined in consideration of the setup environment of the multifunction peripheral. Possible examples of the setup environment include locations having different security levels, such as an office, a satellite office, a co-working space, and a home environment.

The present exemplary embodiment will be described citing LIKELIHOOD_UNSPECIFIED, VERY_UNLIKELY, UNLIKELY, POSSIBLE, LIKELY, and VERY_LIKELY as examples of the alert information received from the information processing apparatus (cloud) 3000. The above-described examples indicate likelihood that confidential information is contained, and, for example, LIKELIHOOD_UNSPECIFIED is alert information output when the likelihood that confidential information is contained is determined to be low as a result of the censorship processing by the information processing apparatus (cloud) 3000. Then, the likelihood that confidential information is contained is increasing in the order of VERY_UNLIKELY, UNLIKELY, POSSIBLE, LIKELY, and VERY_LIKELY. Many application programing interfaces (APIs) are published for the information processing apparatus (cloud) 3000 having the censorship function, and the alert information does not have to be limited to the use of only the above-described alert information.

The result of the censorship processing by the information processing apparatus (the cloud server) 3000 allows the multifunction peripheral 1000 to sort out its own processing according to this processing result. This sort-out of the processing allows the multifunction peripheral 1000 to set the processing as the multifunction peripheral 1000 itself independently of the result of the censorship by the cloud 3000. In the present exemplary embodiment, for example, if the alert information of LIKELIHOOD_UNSPECIFIED is received on the multifunction peripheral 1000, the operation on the cloud service 3000 is set to data copiable. The operation on the cloud 3000 in this setting table 500 refers to processing that the multifunction peripheral 1000 performs toward the cloud service 3000. When being set to "data copiable", the operation on the cloud service 3000 is such an operation that the print data can be acquired from the cloud service 3000 to the multifunction peripheral 1000, and the multifunction peripheral 1000 performs an operation of copying the data (acquiring the data) toward the cloud 3000. The operation "only Read permitted" is such an operation that the printing from the cloud service 3000 to the multifunction peripheral 1000 is prohibited but the data of the cloud service 3000 having the censorship function can be displayed on the multifunction peripheral 1000. The operation "even Read prohibited" is such an operation that even a display of the data on the cloud service 3000 on the multifunction peripheral 1000 is impossible, and the multifunction peripheral 1000 changes the access privilege toward the cloud service 3000. The operation on the multifunction peripheral 1000 refers to a setting of whether the print operation on the multifunction peripheral 1000 can be performed. If the operation is set to "printable", the data can be printed on the multifunction peripheral 1000 and therefore is printed. If the operation is set to "non-printable", this means that the printing on the multifunction peripheral 1000 is prohibited. This processing performed on the multifunction peripheral 1000 is not limited to the present exemplary embodiment, and can be set according to the device specifications and how the multifunction peripheral 1000 is used.

Further, the content of the setting table 500 may differ for each multifunction peripheral individually. An example of the determination about the operation according to each setup location is indicated in a setting table 510 in FIG. 5B for descriptive purposes. For example, even if the alert type is the same POSSIBLE, the data can be printed on a multifunction peripheral set up in the office but is determined to be non-printable on a multifunction peripheral set up in a satellite office or at home. This allows the printability/non-printability to be determined in consideration of the setup environment of the printing apparatus according to the result of the censorship on the cloud service 3000.

Figure 6:
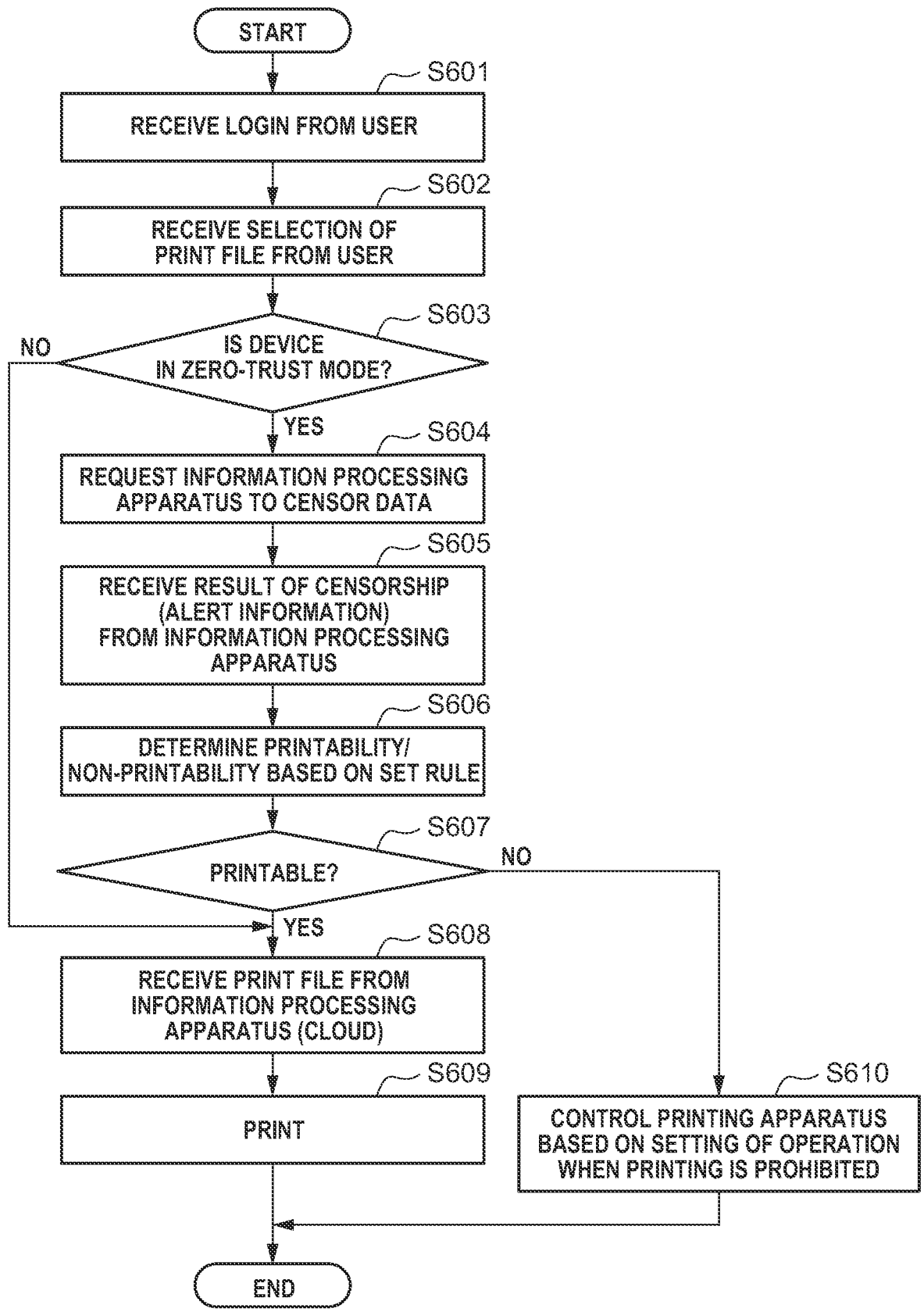
FIG. 6 illustrates an example of a flowchart according to one or more aspects of the present disclosure.

FIG. 6 is a flowchart when the user prints data stored in the information processing apparatus (the cloud service) 3000 having the censorship function in the system according to the first exemplary embodiment.

In step S601, the multifunction peripheral 1000 receives a login from the user. Then, in step S602, the multifunction peripheral 1000 receives an instruction to print the print data selected by the user.

Next, in step S603, the CPU 211 determines whether a zero-trust mode of the multifunction peripheral 1000 is enabled based on an operation setting value at the time of the zero-trust mode, which is managed by the operation setting management unit 318.

If the result of the determination in step S603 indicates that the zero-trust mode of the multifunction peripheral 1000 is enabled (YES in step S603), the processing proceeds to step S604, in which the CPU 211 requests the information processing apparatus (the cloud service) 3000 having the data censorship function to perform the censorship processing. The request at this time is assumed to be a request using an API published on the cloud service 3000. For example, supposing that the user sets a zero-trust mode 701 of the multifunction peripheral 1000 to enable it, the processing in this case will be described. In this case, information about a trigger according to a specific API is transmitted from the multifunction peripheral 1000 to the information processing apparatus 3000. When receiving the information about the trigger, the information processing apparatus 3000 returns the alert information illustrated in FIGS. 5A and 5B from the cloud service 3000 to the multifunction peripheral 1000. The printing system may be configured in such a manner that the censorship processing is automatically performed on the information processing apparatus 3000 not only in response to the request to conduct the censorship but also when the user selects a file that the user wants to print on the multifunction peripheral 1000. If the zero-trust mode is not enabled (NO in step S603), the processing proceeds to step S608.

Then, in step S605, the information processing apparatus (the cloud) 3000 performs the censorship processing on the selected print data set as the print target, and the multifunction peripheral 1000 receives the alert information from the information processing apparatus 3000 after the end of the censorship processing. Then, the processing proceeds to step S606.

In step S606, the printing determination processing unit 319 refers to the operation setting management unit 318 and determines the printability/non-printability at the time of the alert information received from the information processing apparatus (the cloud) 3000 in step S605.

In step S607, whether the above-described print data can be printed is determined based on the operation of the printability/non-printability determination processing in step S606. More specifically, the CPU 211 determines whether the operation on the multifunction peripheral 1000 is set to printable in the operation table 500 indicating the operation when the alert information is acquired after the printability/non-printability determination processing in step S606. Then, if the print data can be printed (YES in step S607), the processing proceeds to step S608.

In step S608, the CPU 211 acquires the print data from the information processing apparatus 3000 (the cloud).

Then, in step S609, the printer control unit 313 prints the above-described print data.

If the operation on the multifunction peripheral 1000 is determined to be printing prohibited in step S607 (NO in step S607), the processing proceeds to step S610. In step S610, the CPU 211 causes the error notification control unit 317 to control the multifunction peripheral 1000 based on the operation setting when the printing is prohibited as the operation setting value at the time of the zero-trust mode, which is managed by the operation setting management unit 318.

The present exemplary embodiment has been described based on the example when the data stored in the cloud service 3000 having the data censorship function is printed, but the storage service storing the print data therein and the service in charge of the DLP may be provided as different cloud services.

FIG. 7 illustrates an example of a screen 700 displayed on the PC 2000 via a remote user interface (UI) of the multifunction peripheral 1000 when the administrator managing the multifunction peripheral 1000 sets the operation of the multifunction peripheral 1000 when the alert information is received from the information processing apparatus 3000 to the printing apparatus, which is illustrated in FIGS. 5A and 5B. The screen 700 illustrated in FIG. 7 may be controlled so as to be displayed on the operation member unit 230 of the multifunction peripheral 1000. The operation of the multifunction peripheral 1000 is an example of an operation in the present exemplary embodiment. The operation of the multifunction peripheral 1000 is set according to an input from the remote UI or the operation member unit 230 of the multifunction peripheral 1000. The setting content illustrated in FIG. 7 is managed by the operation setting management unit 318.

The screen for setting the operation at the time of the alert 700 includes the zero-trust mode setting 701, a print operation setting at the time of the alert 702, and an operation setting when the printing is prohibited 703. If a check box at the zero-trust mode setting 701 is checked into a selected state, the zero-trust mode of the multifunction peripheral 1000 is enabled. When the zero-trust mode is enabled, the multifunction peripheral 1000 requests the information processing apparatus (the cloud) 3000 to perform the processing to censor the print data before starting the printing. On the other hand, if the check box at the zero-trust mode setting 701 is unchecked into a deselected state, the multifunction peripheral 1000 starts printing this print data without requesting the information processing apparatus (the cloud) 3000 to perform the censorship processing.

The operation used for the printability/non-printability determination processing after the alert information is acquired from the information processing apparatus (3000) is set at the operation setting at the time of the alert 702. Examples of the alert information include information such as LIKELY and VERY_UNLIKELY. The names and the number of alert types are not limited to the examples illustrated in FIG. 7. In the present exemplary embodiment, the operation of the multifunction peripheral 1000 at the time of each of the plurality of pieces of alert information can be set as illustrated in FIG. 7.

A setting regarding the operation when the printing determination processing unit 319 determines that the printing is prohibited is selected at the operation setting when the printing is prohibited 703. More specifically, "display prohibition on the operation unit", which displays that the printing is prohibited on the operation unit of the multifunction peripheral 1000, and "e-mail notification", which issues a notification indicating that the print data is non-printable data by e-mail, are set at the operation setting when the printing is prohibited 703. When an OK button 720 is selected, an instruction to register the operation setting values when the alert is acquired, which are input on the screen for setting the operation at the time of the alert 700, is transmitted from the PC 2000 to the multifunction peripheral 1000.

The CPU 211 stores the operation setting values when the alert information is acquired from the PC 2000 into the HDD 214 or the like, and ends the present processing.

Figure 8:
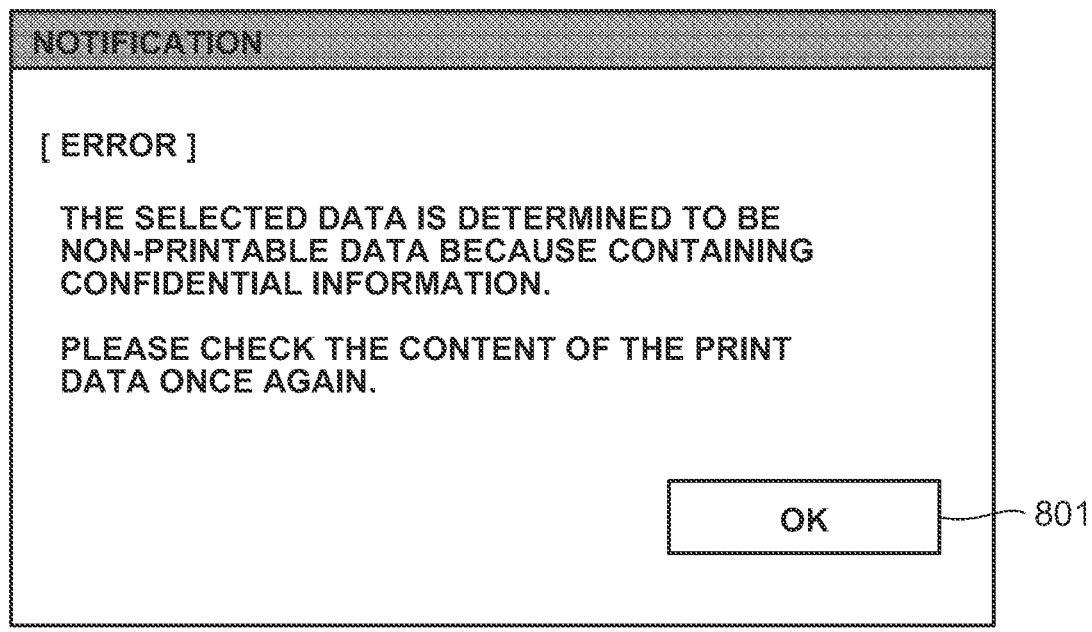
FIG. 8 illustrates an example of a notification screen when printing is prohibited.

FIG. 8 illustrates an example of a warning screen 800 displayed on the operation member unit 230 when the printability/non-printability result is determined to be the prohibition in step S607 in FIG. 6. A message prompting the user to confirm the content of the print data and an OK button 801 are displayed on the warning screen 800. When the user presses the OK button 801, the screen displayed on the operation member unit 230 transitions to the previous operation screen.

In this manner, the print control can be performed according to the setup environment of the image forming apparatus and/or the user privilege of the login user based on the result of the censorship on the server.

Next, a second exemplary embodiment of the present disclosure will be described.

In the first exemplary embodiment, the information processing apparatus (the cloud) 3000 performs the censorship processing according to the issue of the request to perform the censorship processing from the multifunction peripheral 1000 to the information processing apparatus (the cloud service) 3000 after the user selects the print data. However, in some cases, the censorship processing has been performed at the point of the storage of the data depending on the information processing apparatus (the cloud service) 3000.

Figure 9:
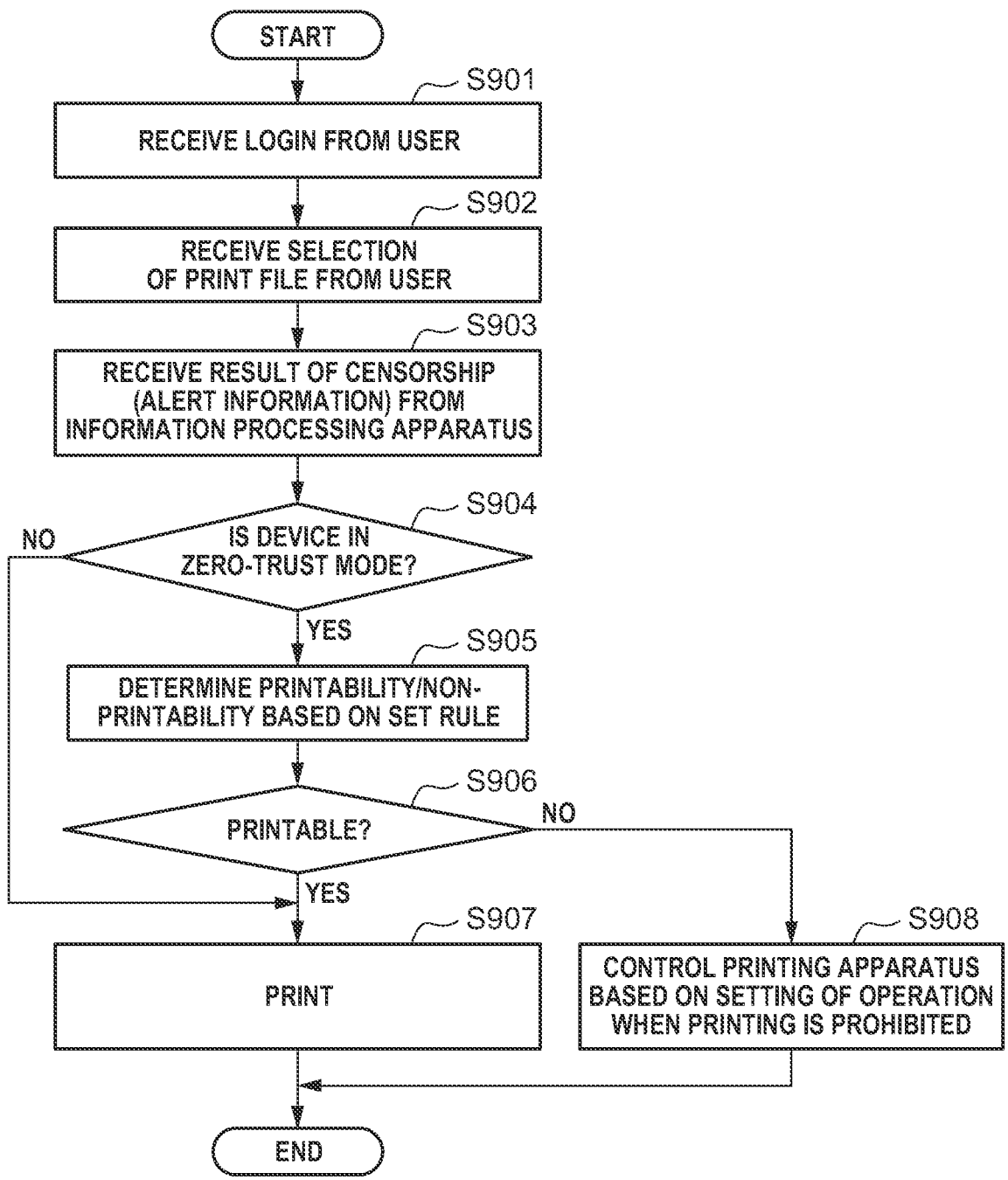
FIG. 9 illustrates an example of a flowchart according to one or more aspects of the present disclosure.

In light thereof, the second exemplary embodiment will be described regarding an operation of the multifunction peripheral 1000 in a case where the alert information is received by the multifunction peripheral 1000 at the same time that the data on the information processing apparatus (the cloud service) 3000 is selected (FIG. 9). Assume that portions that will not be described in the present exemplary embodiment are similar to the first exemplary embodiment.

In steps S901 and S902, the multifunction peripheral 1000 receives a login from the user and receives a selection of print data similarly to the first exemplary embodiment.

Then, in step S903, the multifunction peripheral 1000 receives the result of the censorship (the alert information) together with the selected print data from the information processing apparatus (the cloud) 3000.

Then, in step S904, the CPU 211 determines whether the multifunction peripheral 1000 is set to the zero-trust mode by the user, similarly to step S603 according to the first exemplary embodiment. If the result of the determination in step S904 indicates that the zero-trust mode is enabled (YES in step S904), the processing proceeds to step S905. If the zero-trust mode is not enabled in step S904 (NO in step S904), the processing proceeds to step S907, in which the printer control unit 313 prints the print data selected by the user.

In steps S905 and S906, processing similar to steps S606 and S607 according to the first exemplary embodiment is performed. Then, in step S906, whether the print data can be printed is determined according to the result of the printing determination processing. If the print data can be printed (YES in step S906), the processing proceeds to step S907, in which the printer control unit 313 prints the print data.

If the operation on the multifunction peripheral 1000 is determined to be printing prohibited in step S906 (NO in step S906), the processing proceeds to step S908. In step S908, the CPU 211 causes the error notification control unit 317 to control the multifunction peripheral 1000 based on the operation setting when the printing is prohibited as the operation setting value at the time of the zero-trust mode, which is managed by the operation setting management unit 318, similarly to step S610 according to the first exemplary embodiment.

In this manner, the multifunction peripheral 1000 can determine the printability/non-printability even when the censorship processing has been performed in advance depending on the type of the information processing apparatus (the cloud) 3000.

Next, a third exemplary embodiment of the present disclosure will be described. In the first exemplary embodiment and the second exemplary embodiment, the printability/non-printability is determined according to the alert information without consideration of the user privilege of the login user of the multifunction peripheral 1000. However, the printing may be permitted according to the user privilege of the user using the multifunction peripheral 1000. In light thereof, the third exemplary embodiment will be described regarding an example in a case where the user privilege of the login user of the multifunction peripheral 1000 is determined.

FIG. 10 illustrates an operation table when the alert information is acquired, which is managed by the operation setting management unit 318 for the multifunction peripheral 1000 in the system according to the third exemplary embodiment. This table indicates an example of an operation setting table 1010 of the printing apparatus according to the user privilege of the login user of the multifunction peripheral 1000. This table will be described using the alert information similar to FIGS. 5A and 5B as the types of the alert information. The example of the operation setting table 1010 is an example that allows the operation of the multifunction peripheral 1000 to be changed between managerial staff and non-managerial staff as the login user of the multifunction peripheral 1000. Setting the operation table of the multifunction peripheral 1000 individually for each user privilege, like the operation setting table 1010, allows the multifunction peripheral 1000 to operate differently according to the login user even when receiving the result of the censorship processing by the same information processing apparatus (the cloud server) 3000. For example, this setting allows the multifunction peripheral 1000 to operate so as to permit managerial staff to print the print data but prohibit non-managerial staff from printing the print data when receiving the alert information of UNLIKELY, which indicates that confidential information is relatively less likely contained.

Figure 11:
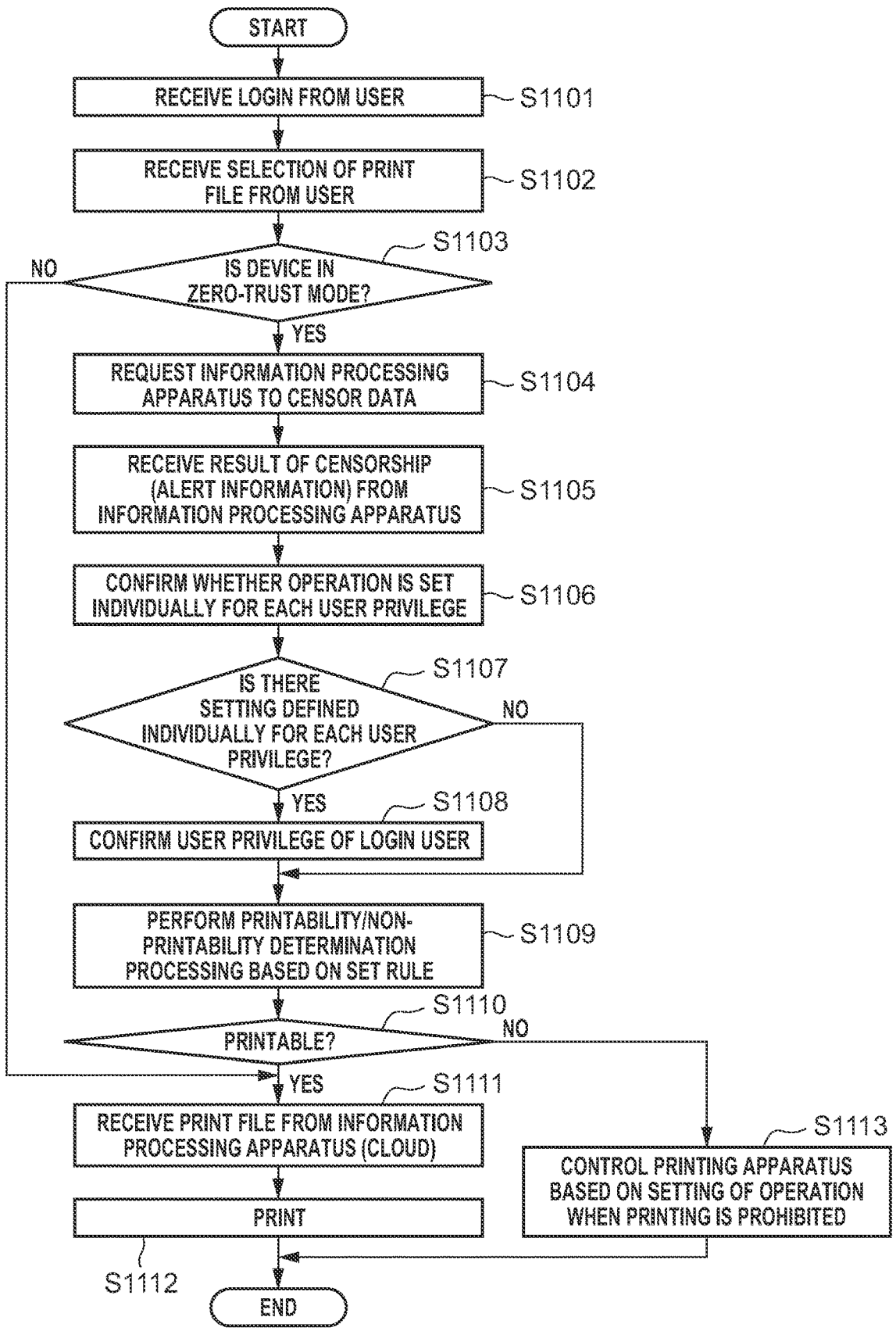
FIG. 11 illustrates an example of a flowchart according to one or more aspects of the present disclosure.

FIG. 11 illustrates a flowchart according to the third exemplary embodiment. Assume that portions that will not be described in the present exemplary embodiment are similar to the first exemplary embodiment.

Steps S1101 to S1105 are similar to steps S601 to S605 according to the first exemplary embodiment (FIG. 6). In step S1106, this step includes the execution of processing to determine whether the operation setting table 1010 managed by the operation setting management unit 318 contains the setting defined individually for each user privilege. If there is the setting defined individually for each user privilege in step S1107 (YES in step S1107), the processing proceeds to step S1108, which causes the CPU 211 to determine the user privilege of the login user of the multifunction peripheral 1000. As the method for this determination, the CPU 211 may be configured to acquire the information from an authentication server, or may be configured to include a unit for registering the user privilege of the login user of the multifunction peripheral 1000 with an operation setting management table or the like in advance and make the determination. Then, in step S1109, the printing determination processing unit 319 refers to the operation setting management unit 318 and performs the processing to determine the printability/non-printability at the time of the alert information received from the information processing apparatus (the cloud) 3000 in step S1105.

In step S1110, whether the above-described print data can be printed is determined based on the operation of the printability/non-printability determination processing in step S1109. After the printability/non-printability determination processing in step S1109, the CPU 211 refers to the operation setting table 1010 according to the user privilege of the login user of the multifunction peripheral 1000 when the alert information is acquired and determines whether this print data can be printed. Then, if the print data can be printed (YES in step S1110), the processing proceeds to step S1111.

Steps S1111 to S1113 are similar to steps S608 to S610 according to the first exemplary embodiment.

This allows the printability/non-printability to be determined according to the user privilege of the login user of the multifunction peripheral 1000.

(Other Exemplary Embodiments)

Having described the present disclosure by indicating various examples and exemplary embodiments of the present disclosure, the spirit and the scope of the present disclosure shall not be limited to a specific description herein.

The present disclosure can also be realized by processing that supplies a program capable of fulfilling one or more functions of the above-described exemplary embodiments to a system or an apparatus via a network or a storage medium, and causes one or more processors in a computer of this system or apparatus to read out and execute the program. Further, the present disclosure can also be realized by a circuit (for example, an application specific integrated circuit (ASIC)) capable of fulfilling one or more functions.

Further, the object of the present disclosure can also be achieved by performing the following processing. That is, the object of the present disclosure can also be achieved by processing that supplies a storage medium recording therein a program code of software capable of fulfilling the functions of the above-described exemplary embodiments to a system or an apparatus, and causes a computer (or a CPU, a micro processing unit (MPU), or the like) of this system or apparatus to read out the program code stored in the storage medium. This case means that the program code itself read out from the storage medium fulfills the functions of the above-described exemplary embodiments, and this program code and the storage medium storing this program code therein constitute the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-152862, filed Sep. 21, 2021, which is hereby incorporated by reference herein in its entirety.

What is claimed is:

1. An image forming apparatus capable of communicating with a system having a censorship function, the image forming apparatus comprising:
    one or more controllers having one or more processors and one or more memories, the one or more controllers configured:
    to receive a first setting for setting whether to use a zero-trust mode of the image forming apparatus from a user;
    to receive a second setting for setting, corresponding to a level, whether printing is performable from the user;
    to transmit a request for executing censorship for print data to the system in a case where the zero-trust mode is set to be used;
    to receive, from the system, information indicating a level specified by the censorship, the level corresponding to whether printing is performable;
    to function according to the received second setting and the information indicating the level specified by the censorship for the print data;
    to receive a selection, from the user, of a first notification method to display a message indicating an error on a screen, in a case where the image forming apparatus determines, based on the received second setting, that printing is not performable or a second notification method to transmit an e-mail including a message indicating an error, in the case where the image forming apparatus determines, based on the received second setting, that printing is not performable; and
    to display a setting screen,
    wherein the first setting, the second setting, and the selection are received from the user in a state that the setting screen is displayed on the screen.

2. The image forming apparatus according to claim 1, wherein the one or more controllers function according to the received level specified by the censorship.

3. The image forming apparatus according to claim 1,
    wherein the one or more controllers authenticate a login user at a time of a login to the image forming apparatus, and
    wherein the one or more controllers function according to a user privilege of the authenticated login user, the received second setting, and the information indicating the level specified by the censorship for the print data.

4. The image forming apparatus according to claim 1, wherein the one or more controllers function according to a place of the image forming apparatus, the received second setting, and the information indicating the level specified by the censorship for the print data.

5. The image forming apparatus according to claim 1, further comprising a printer that prints an image based on the print data on a recording sheet, wherein the printer prints the image in a case where it is determined, based on the received second setting and information indicating the level, that printing is performable.

6. The image forming apparatus according to claim 1, wherein the one or more controllers change a privilege for the print data targeted for the censorship to a read-only privilege based on the second setting and the received information indicating the level specified by the censorship.

7. The image forming apparatus according to claim 1, further comprising the screen to display the message indicating the error, wherein the image forming apparatus displays the message indicating that the print data cannot be printed on the screen in a case where the one or more controllers determine, based on the received second setting and the information indicating the level specified by the censorship, that printing is not performable.

8. The image forming apparatus according to claim 1, wherein the one or more controllers transmit the e-mail including the message in a case where the one or more controllers determine, based on the received second setting and the information indicating the level specified by the censorship, that printing is not performable.

9. The image forming apparatus according to claim 1, wherein the system having the censorship function includes one or more servers.

10. The image forming apparatus according to claim 1, wherein the level is specified based on possibility of containing confidential information.

11. The image forming apparatus according to claim 1, wherein the image forming apparatus processes on the print data targeted for the censorship while masking a confidential information portion of the print data, in a case where the one or more controllers determine, based on the received second setting and the information indicating the level specified by the censorship, that printing is not performable.

12. The image forming apparatus according to claim 1, wherein, in a case where the zero-trust mode is set to be not used, the image forming apparatus executes printing without transmitting the request to the system.

13. A printing system including one or a plurality of servers and an image forming apparatus, the printing system comprising:
    one or more controllers having one or more processors and one or more memories, the one or more controllers configured:
    to receive a first setting for setting whether to use a zero-trust mode of the image forming apparatus from a user;
    to receive a second setting for setting, corresponding to a level, whether printing is performable from the user;
    to receive a print instruction from the user;
    to censor, based on the received print instruction, print data to specify the level in a case where the zero-trust mode is set to be used, the print data being targeted for printing;
    to receive information indicating the specified level corresponding to whether printing is performable;
    to function according to the received second setting and the information indicating the level specified by the censorship for the print data;
    to receive a selection, from the user, of a first notification method to display a message indicating an error on a screen, in a case where the image forming apparatus determines, based on the received second setting, that printing is not performable or a second notification method to transmit an e-mail including a message indicating an error in the case where the image forming apparatus determines, based on the received second setting, that printing is not performable; and
    to display a setting screen, wherein the first setting, the second setting, and the selection are received from the user in a state that the setting screen is displayed on the screen.

14. The printing system according to claim 13, wherein the one or more controllers authenticate a login user at a time of a login to the image forming apparatus, and
wherein the one or more controllers function according to a user privilege of the authenticated login user, the received second setting, and the information indicating the level specified by the censorship for the print data.

15. The printing system according to claim 13, wherein the one or more controllers function according to a place of the image forming apparatus, the received second setting, and the information indicating the level specified by the censorship for the print data.

16. The printing system according to claim 13, further comprising a printer that prints an image based on the print data on a recording sheet, wherein the printer prints the image in a case where it is determined, based on the received second setting and information indicating the level, that printing is performable.

17. The printing system according to claim 13, wherein the one or more controllers change a privilege for the print data targeted for the censorship to a read-only privilege based on the second setting and the received information indicating the level specified by the censorship.

18. The printing system according to claim 13, further comprising the screen to display the message indicating the error, wherein the one or more controllers display the message indicating that the print data cannot be printed on the screen in a case where the one or more controllers determine, based on the received second setting and the information indicating the level specified by the censorship, that printing is not performable.

19. The printing system according to claim 13, wherein the one or more controllers censor whether a preset prohibited word is contained in a content of the print data.

20. The printing system according to claim 12, wherein the one or more controllers transmit the e-mail including the message in a case where the one or more controllers determine, based on the received second setting and the information indicating the level specified by the censorship, that printing is not performable.

21. The printing system according to claim 13, wherein the level is specified based on possibility of containing confidential information.

22. A method for controlling a printing system including one or more servers and an image forming apparatus, the method comprising:
receiving a first setting for setting whether to use a zero-trust mode of the image forming apparatus from a user;
receiving a second setting for setting, corresponding to a level, whether printing is performable from the user;
receiving a print instruction from the user;
censoring, based on the receive print instruction, print data to specify the level in a case where the zero-trust mode is set to be used, the print data being targeted for printing;
receiving information indicating the specified level corresponding to whether printing is performable;
functioning according to the receiving second setting and the information indicating the level specified by the censorship for the print data; and
receiving a selection, from the user, of a first notification method to display a message indicating an error on a screen, in a case where the image forming apparatus determines, based on the received second setting, that printing is not performable or a second notification method to transmit a mail including a message indicating an error in the case where the image forming apparatus determines, based on the received second setting, that printing is not performable; and
displaying a setting screen,
wherein the first setting, the second setting, and the selection are received from the user in a state that the setting screen is displayed on the screen.

* * * * *